Figure 1:
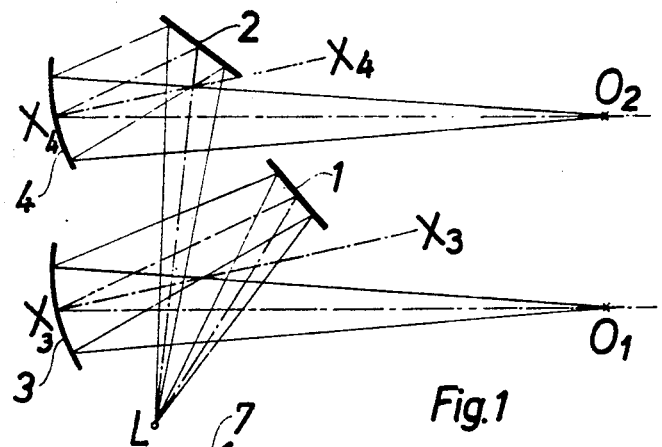

May 3, 1960    H. RIESENBERG    2,934,995
MIRROR SYSTEMS, PARTICULARLY FOR ULTRA-RED SPECTRAL APPARATUS
Filed Jan. 20, 1958    2 Sheets-Sheet 2

Inventor:
Horst Riesenberg

United States Patent Office 2,934,995
Patented May 3, 1960

2,934,995

MIRROR SYSTEMS, PARTICULARLY FOR ULTRA-RED SPECTRAL APPARATUS

Horst Riesenberg, Jena, Germany, assignor to VEB Carl Zeiss Jena, Jena, Germany

Application January 20, 1958, Serial No. 710,163

1 Claim. (Cl. 88—14)

This invention relates to a mirror system, particularly for ultra-red spectral apparatus, for the purpose of regulating the two ray paths between a gap or the like and two images of this gap, lying apart from one another, in such a manner that images of equal size correspond to the gap, while the mirror system contains plane mirrors in addition to two concave mirrors of the same curvature and each disposed in one of the two ray paths.

The invention has the object of obtaining said two images not only with the same size but also in complete optical equivalence. In order to obtain images of this kind, the two concave mirrors are according to the invention so disposed that their axes are parallel to one another, and the plane mirrors provided are so arranged that the axes of those parts of the two pencils of image forming rays which lie between each concave mirror and a plane mirror are also parallel to one another.

The invention can also serve the converse purpose of depicting images of complete optical equivalence in such a manner that two coincident images are produced.

In the simplest case, the mirror system of the present invention contains in each of the two ray paths only one plane mirror in addition to a concave mirror. However, advantageous mirror systems according to the invention having more than two reflections in each ray path are also possible, provided only that the number of reflections in the two ray paths is the same.

The two pencils of rays necessary for producing images at two points can be formed either by means of a beam splitting device having physical or geometrical splitting or may be present from the outset, by using two partial pencils from the range of the rays emitted, for example from a source of light.

In the case of a mirror system having beam splitting by means of a mirror which is disposed movably in such a manner that it can be alternately brought into a position inside and into a position outside the ray path, it is advisable to provide in addition optical means for the purpose of producing an intermediate image at the location of this mirror. The effect is thereby achieved that the images produced will remain at rest, even in the case of inaccurate mirror movement.

In the case of physical beam splitting by means of a plate with a splitting coating it may be of advantage for the purpose of obtaining equal optical path lengths and equality of the physical conditions in both beams, to provide special equalising means, e.g. a compensating plate and a plane mirror corresponding to the splitting plate.

It is advantageous to combine two mirror systems according to the invention in such a manner that a two-beam alternating light device is obtained, in which by means of one of the two mirror systems two optically equivalent images are formed by a gap or the like at separate points and of these two images two coincident images are produced by means of the other mirror system.

Figure 2:
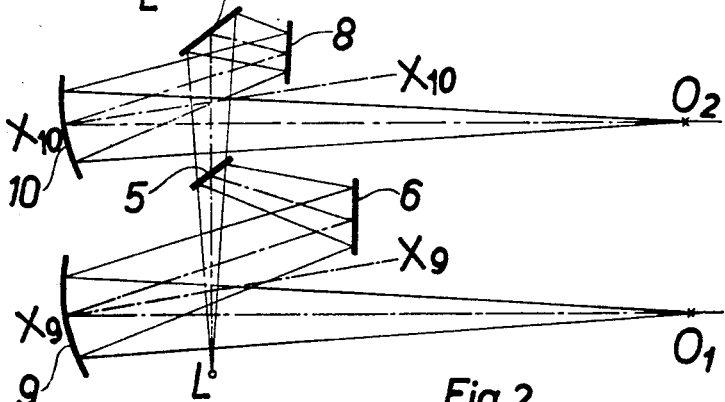
Figure 3:
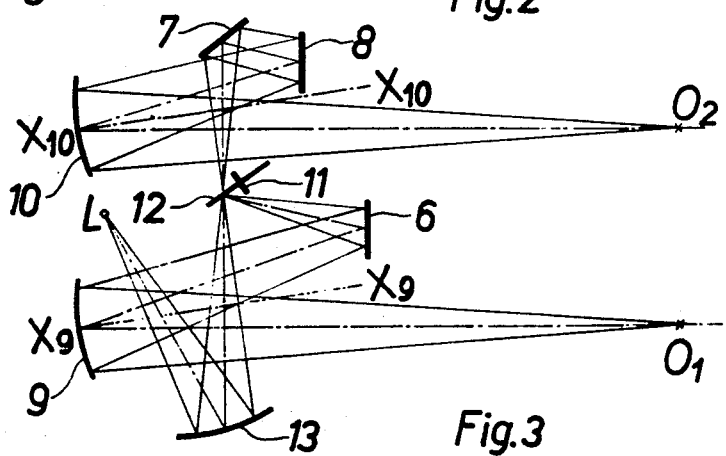
Figure 4:
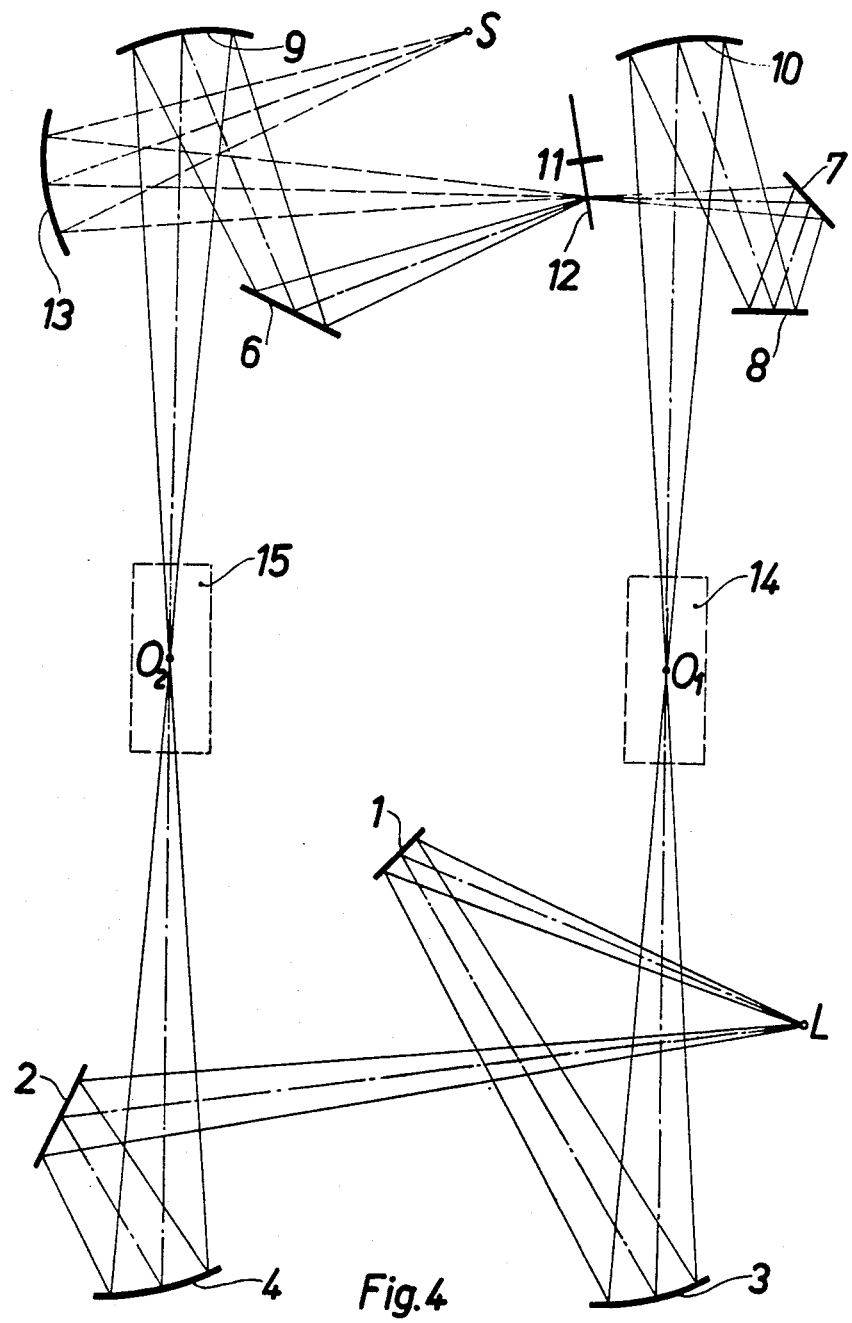

In order that the invention may be more readily understood, reference is made to the accompanying drawings, which illustrate diagrammatically and by way of example several embodiments thereof, and in which:

Figs. 1 to 3 show three embodiments of mirror systems according to the invention; and Fig. 4 shows an embodiment of a two-beam alternating light device according to the invention, intended for an ultra-red spectral photometer.

The mirror system illustrated in Figure 1 contains two plane mirrors 1 and 2 and two concave mirrors 3 and 4 of equal curvature and having axes $X_3$—$X_3$ and $X_4$—$X_4$ parallel to one another and in mutual situations such that when using two pencils of the same aperture from the beams passing out of a linear radiation source L, one pencil produces an image $O_1$ after reflection on the plane mirror 1 and on the concave mirror 3, while the other pencil after reflection on the plane mirror 2 and on the concave mirror 4 produces an image $O_2$ of the radiation source L. The parts of the axial beams of the two pencils, depending on the reflection on the corresponding plane mirror and depending on the reflection on the corresponding concave mirror are parallel to one another, and the lengths of the axial beams from the radiation source L to the images $O_1$ and $O_2$ are equal to one another, so that the two images $O_1$ and $O_2$ are optically completely equivalent.

The mirror system illustrated in Figure 2 contains four plane mirrors, 5, 6, 7 and 8, of which the mirror 5 is half transparent, and also two concave mirrors 9 and 10 which have the same curvature and axes $X_9$—$X_9$ and $X_{10}$—$X_{10}$ parallel to one another. The mirrors have mutual situations such that a pencil of rays emitted from a radiation source L first impinges on the half transparent mirror 5 and is split into two parts, one of which after reflection on the mirrors 5, 6 and 9 produces an image $O_1$ and the other part after passing through freely at 5 and reflection on the mirrors 7, 8 and 10 produces an image $O_2$ of the source of radiation L. The axial beams between the mirrors 6 and 9 on the one hand and between the mirrors 8 and 10 on the other hand, and between $O_1$ and the concave mirror 9 on the one hand and between $O_2$ and the concave mirror 10 on the other hand are in this arrangement parallel to one another. In addition, the lengths of the axial beams from L to $O_1$ and $O_2$ are equal to one another, so that the two images $O_1$ and $O_2$ are optically completely equivalent.

The mirror system illustrated in Figure 3 differs from that in Figure 2 only in that in place of the half transparent mirror 5 a mirror 12 rotatable about an axis 11 is provided and in that the source of radiation L is in a position such that an additional concave mirror 13 at the location of the mirror 12 throws an intermediate image of the radiation source L. The mirror 12 is so formed that when it rotates about the axis 11 the pencil of rays reflected by the concave mirror 13 is at times reflected and directed to the plane mirror 6 and at times allowed to pass through, so that it impinges on the plane mirror 7.

The two-beam alternating light device as illustrated in Figure 4, which is intended for an ultra-red spectral photometer, is composed of a mirror system according to Figure 1 and a mirror system according to Figure 3 in such a manner that the ray path in the latter mirror system is inverted. From the linear radiation source L two pencils of rays are emitted, one of which is deflected by the plane mirror 1 and the concave mirror 3 in such a manner that an image $O_1$ of the radiation source L is produced, while the other is so deflected by the plane mirror 2 and the concave mirror 4 that an image $O_2$ of L is produced.

The second mirror system, which corresponds to that illustrated in Figure 3, contains two concave mirrors 9 and 10 and four plane mirrors 6, 7, 8 and 12, of which the mirror designated by 12 is rotatable about an axis 11. The mirrors 10, 8 and 7 trace an intermediate image of the image $O_1$ and the mirrors 9 and 6 an intermediate image of the image $O_2$ at the location of the rotatable mirror 12. The pencil of rays emitted from $O_1$, on rotation of the mirror 12 after reflection on the mirrors 10, 8 and 7, is allowed to pass through and impinges on an additional concave mirror 13 which is constructed in the same way as the concave mirrors 3, 4, 9 and 10 and causes an image of $O_1$ to be produced at S. The pencil of rays emitted from $O_2$ after reflection on the mirrors 9 and 6, on rotation of the mirror 12 continues to be reflected by said mirror and causes an image of $O_2$ to be also produced at S. The arrangement of the mirrors is such that the two images produced at S coincide with one another. The reference numerals 14 and 15 designate the two cells of the photometer.

I claim:

An optical arrangement for ultrared spectral apparatus, comprising a linear radiation source, two ray paths emanating from said source, two mirror systems, each of said mirror systems containing plane mirrors and two concave mirrors of equal curvature, the one of said concave mirrors being disposed in the one of said two ray paths and the other of said concave mirrors being disposed in the other of said two ray paths, said two concave mirrors being so positioned relatively to each other that their axes are parallel to each other, and said plane mirrors having such positions that the axes of those parts of said two ray paths which lie in each case between a concave mirror and a plane mirror are also parallel to each other, the one of said mirror systems producing in each of said ray paths an image of said source, said two images being optically equivalent, the other of said mirror systems containing a rotatable beam-chopping mirror, said beam-chopping mirror being disposed at the place at which the images of said source are produced by said two ray paths from said two mirror systems, and optical means producing two coincident images of said source in a plane outside said two mirror systems.

References Cited in the file of this patent
UNITED STATES PATENTS

| | | |
|---|---|---|
| 2,636,415 | Zobel | Apr. 28, 1953 |
| 2,648,250 | Zobel | Aug. 11, 1953 |